(12) United States Patent
Shen

(10) Patent No.: US 9,354,437 B2
(45) Date of Patent: May 31, 2016

(54) OBJECT FINDER MOUNTING APPARATUS, SYSTEMS FOR VIEWING OBJECTS AND METHODS FOR USING SAME

(75) Inventor: Dar-Tson Shen, West Vancouver (CA)

(73) Assignee: Suzhou Synta Optical Technology Co., Ltd., New District Suzhou (CN)

( * ) Notice: Subject to any disclaimer, the term of this patent is extended or adjusted under 35 U.S.C. 154(b) by 322 days.

(21) Appl. No.: 13/594,706

(22) Filed: Aug. 24, 2012

(65) Prior Publication Data

US 2013/0222900 A1    Aug. 29, 2013

(30) Foreign Application Priority Data

Feb. 29, 2012   (CN) .......................... 2012 1 0048219

(51) Int. Cl.
*G02B 23/14* (2006.01)
*G02B 23/16* (2006.01)
(52) U.S. Cl.
CPC ................ *G02B 23/14* (2013.01); *G02B 23/16* (2013.01)
(58) Field of Classification Search
CPC .................. G02B 23/14–23/145; G02B 23/12; G02B 23/00
See application file for complete search history.

(56) References Cited

U.S. PATENT DOCUMENTS

| 249,022 | A |   | 11/1881 | Davis et al. |   |
|---|---|---|---|---|---|
| 2,173,545 | A | * | 9/1939 | Wall | ................................ 33/268 |
| 4,027,943 | A |   | 6/1977 | Everett |   |
| 5,107,370 | A |   | 4/1992 | Dey |   |
| 6,369,942 | B1 | * | 4/2002 | Hedrick et al. | ................ 359/430 |
| 6,445,498 | B1 | * | 9/2002 | Baun et al. | .................... 359/430 |
| 6,614,593 | B2 |   | 9/2003 | Sadler |   |
| 6,865,035 | B2 |   | 3/2005 | Barziza |   |
| 7,177,077 | B2 |   | 2/2007 | Sadler |   |
| 7,190,515 | B2 |   | 3/2007 | Sidorin et al. |   |

FOREIGN PATENT DOCUMENTS

| CN | 2657038 Y | 11/2004 |
| CN | 101101380 | 1/2008 |
| CN | 201322823 Y | 10/2009 |
| CN | 201322824 Y | 10/2009 |
| CN | 201654303 U | 11/2010 |
| CN | 202177745 | 3/2012 |
| FR | 2812951 | 2/2002 |
| JP | 2005-140867 A | 6/2005 |

* cited by examiner

*Primary Examiner* — Scott J Sugarman
*Assistant Examiner* — Robert E Tallman
(74) *Attorney, Agent, or Firm* — Todd A. Rattray; Oyen Wiggs Green & Mutala LLP

(57) ABSTRACT

An object-finder-mounting apparatus comprises: a base for mounting the object-finder-mounting apparatus to an optical instrument; an object-finder-holder assembly coupled to the base and comprising one or more object-finder holders for removably holding an object finder; a projection plate moveably coupled to the base and/or the object-finder-holder assembly for movement between first and second positions; and a shadow-casting member. The object-finder-mounting apparatus is convertible between first and second working modes. In the first working mode, the projection plate is moved to the first position which permits use of the object finder held by the object-finder holders to locate objects. In the second working mode, the object finder is removed from the object-finder holders and the projection plate is moved to the second position. In the second working mode, the shadow-casting member casts a shadow onto the projection plate when the optical instrument is directed toward a luminous object.

23 Claims, 12 Drawing Sheets

US 9,354,437 B2

OBJECT FINDER MOUNTING APPARATUS, SYSTEMS FOR VIEWING OBJECTS AND METHODS FOR USING SAME

RELATED APPLICATIONS

This application is a continuation in part of Patent Cooperation Treaty application No. PCT/CN2012/000265 filed 2 Mar. 2012 which in turn claims priority from Chinese patent application No. CN201210048219 filed 29 Feb. 2012, both of which are hereby incorporated herein by reference.

TECHNICAL FIELD

The present invention relates to optical instruments. Particular embodiments provide object-finder-mounting apparatus which may mount object finders (e.g. spotting scopes and the like) to primary optical instruments, such as telescopes, surveying instruments and/or the like.

BACKGROUND

So-called spotting scopes (also known as finderscopes) are examples of object finders which may be used in conjunction with primary (typically high-magnification) optical instruments. By way of non-limiting example, such primary optical instruments may include telescopes (e.g. in the field of astronomy), surveying instruments and/or the like. Spotting scopes function as object finders and permit users to quickly find target object(s) to be observed by looking through the spotting scope. Typically, a spotting scope has a relatively wide field of view in comparison to the high-magnification primary optical instrument with which the spotting scope is used, so that it is relatively easy to locate target objects using the spotting scope in comparison to the high-magnification primary scope. When used in conjunction with a telescope, a spotting scope is typically mounted to the telescope. The optical axes of the telescope and spotting scope may then be aligned to be parallel with one another, so that the fields of view of the spotting scope and the telescope are oriented in the same direction. In use, a user first uses the spotting scope as an object finder by looking through the spotting scope and moving the combination of the spotting scope and the telescope until the target object(s) are located in the relatively wide field of view of the spotting scope. While continuing to look through the spotting scope, the user then moves the combination of the spotting scope and the telescope, such that the target object(s) are located approximately at the center of the field of view of the spotting scope. When the spotting scope is properly mounted (aligned) with the telescope and the telescope is positioned in this manner using the spotting scope, the target object(s) will be located at least approximately at the center of the field of view of the telescope.

Spotting scopes may also be used as object finders to manually correct errors associated with so-called "auto-tracking" telescope systems. As is well known, the rotation of the earth about its axis causes celestial objects observed from the surface of the earth to appear to move across the sky. An auto-tracking telescope system automatically orients its telescope to track the movement of a target celestial object, such that the target celestial object appears to stay at the center of the field of view of the telescope. Auto-tracking telescope systems typically depend on user input information (e.g. the time and date at the observer location, the geographical coordinates of the observer location and telescope axial references (e.g. a reference to true north and a reference to the horizon)). Such user input information may be measured and/or directly input by a user. Because this user-input information may have errors and/or because of other inaccuracies, auto-tracking telescope systems may exhibit tracking errors (where the target celestial object moves away from the center of the field of view of the telescope), particularly over extended periods of observation. Spotting scopes can be used as object finders by users to quickly re-center the target objects in the center of the field of view of the telescope, so that auto-tracking may resume with the target object(s) in the center of the telescope field of view.

Current spotting scopes are designed to find and observe particular types of target objects. For example, an existing spotting scope designed to find distant stars cannot be used to observe the sun without the potential for causing damage to the eye of the observer.

There is a general desire for versatile techniques for locating objects so that objects may be viewed using high-magnification optical instruments (e.g. telescopes, surveying instruments and/or the like).

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an object-finder-mounting apparatus for mounting an object finder to an optical instrument. The apparatus comprises: a base for coupling the object-finder-mounting apparatus to an optical instrument; an object-finder-holder assembly extending from the base, the object-finder-holder assembly comprising one or more object-finder holders for removably holding an object finder; a shadow-casting member; and a projection plate moveably coupled to at least one of the base, the object-finder-holder assembly and the shadow-casting member for movement between a first position and a second position. The object-finder-mounting apparatus is convertible between: a first working mode, wherein the object finder is held by the one or more object-finder holders and the projection plate is moved to the first position, thereby permitting use of the object finder held by the one or more object-finder holders to locate objects; and a second working mode wherein the object finder is removed from the one or more object-finder holders, the projection plate is moved to the second position and a shadow of at least a portion of the shadow-casting member is cast onto the projection plate when the optical instrument is directed toward a luminous object.

In some embodiments, the projection plate may be pivotally coupled to at least one of the base, the object-finder-holder assembly and the shadow-casting member for pivotal movement between the first position and the second position. Movement of the projection plate between the first and second positions may involve movement of the projection plate relative to the shadow-casting member. In some embodiments, when the projection plate is in the first position, the projection plate rests on an adjacent surface of the object-finder-holder assembly and/or the base; however, unless otherwise specified, the first position of the projection plate should be construed to include any other configurations of the projection plate that allow the object finder to be used to locate objects while being held by the one or more object-finder holders. In some embodiments, when the projection plate is in the second position, the projection plate projects away from the adjacent surface of the object-finder-holder assembly and/or the base; however, unless otherwise specified, the second position of the projection plate should be construed to include any configurations of the projection plate that allow the shadow of the at least a portion of the shadow-casting member to be projected onto the surface of the projection plate when the optical instrument is directed toward a luminous object. In some embodiments, moving the projection plate to its first position involves orienting a generally planar surface of the projection plate to be relatively more aligned with the adjacent surface of the object-finder-holder assembly and/or the base and moving the projection plate to its second position involves orienting the generally planar surface of the projection plate to extend relatively further way from the adjacent surface of the object-finder-holder assembly and/or the base.

The object finder may comprise a spotting scope, a red beam finder, a laser pointer, a viewfinder and/or any other instrument that may assist a user in pointing the optical instrument towards a specific target object.

In particular embodiments, the object-finder-holder assembly may comprise one or more front object-finder-holders for removably holding a forward portion of the object finder when the object-finder-mounting apparatus is in the first working mode. In some embodiments, the front object-finder holder may comprise a ring through which the front portion of the object finder extends when the object-finder-mounting apparatus is in the first working mode. The front object-finder holder may comprise one or more elastic claws for grasping the object finder. In some embodiments, the shadow-casting member may be provided in whole or in part by a portion of the front object-finder holder, such that when the object-finder-mounting apparatus is in the second working mode, a shadow of at least the portion of the front object-finder holder may be projected onto the surface of the projection plate when the optical instrument is directed toward a luminous object.

In some embodiments, the object-finder-holder assembly comprises one or more rear object-finder holders for removably holding a rearward portion of the object finder when the object-finder-mounting apparatus is in the first working mode. In some embodiments, the rear object-finder holder may comprise a ring through which the rear portion of the object finder extends when the object-finder-mounting apparatus is in the first working mode. The rear object-finder holder may comprise one or more elastic claws for grasping the object finder.

In some embodiments, the projection plate may be located between the front object-finder holder and the rear object-finder holder when the object-finder-mounting apparatus is in its first working mode. In some embodiments, the projection plate may be located between the front object-finder holder and the rear object-finder holder when the object-finder-mounting apparatus is in its second working mode. In some embodiments, the projection plate may be located between the front object-finder holder and the rear object-finder holder when the object-finder-mounting apparatus is in both its first working mode and its second working mode.

In some embodiments, the shadow-casting member may be movably coupled to at least one of the base and the object-finder holder assembly. When the object-finder-mounting apparatus is in the first working mode, the shadow casting member may be moved to a first position which permits the use of the object finder held by the one or more object-finder holders to locate objects, and, when the object-finder-mounting apparatus is in the second working mode, the shadow casting member may be moved to a second position wherein the shadow of at least a portion of the shadow casting member is projected onto the projection plate when the optical instrument is directed toward a luminous object.

In particular embodiments, at least one of the object-finder holders may comprise an adjustment mechanism for adjusting an orientation of the optical axis of the object finder held thereby. The adjustment mechanism may comprise a plurality of threadably adjustable adjustment screws which bear on a body of the object finder such that threadable adjustment of the adjustment screws changes the orientation of the object finder. The at least one of the object-finder holders may comprise a ring through which the object finder extends when the object-finder mounting apparatus is in the first working mode and the adjustment screws may project through the ring to bear on the body of the object finder.

Another aspect of the invention provides a multi-function object finding system comprising: a base for coupling an object-finder-mounting apparatus to an optical instrument; an object-finder-holder assembly extending from the base, the object-finder-holder assembly comprising one or more object-finder holders for removably holding an object finder; a shadow-casting member; and a projection plate moveably coupled to at least one of the base, the object-finder-holder assembly and the shadow-casting member for movement between a first position and a second position. The multi-function object finding system is convertible between: a first working mode, wherein the object finder is held by the one or more object-finder holders and the projection plate is moved to the first position, thereby permitting use of the object finder held by the one or more object-finder holders to locate objects; and a second working mode wherein the object finder is removed from the one or more object-finder holders, the projection plate is moved to the second position and a shadow of at least a portion of the shadow-casting member is cast onto the projection plate when the optical instrument is directed toward a luminous object.

Another aspect of the invention provides a system for viewing objects with an optical instrument. The system comprises: an optical instrument for viewing objects; an object finder mountable to the optical instrument for locating objects for viewing with the optical instrument; and an object-finder-mounting apparatus for mounting the object finder to the optical instrument. The object-finder-mounting apparatus comprises: a base for coupling the object-finder-mounting apparatus to the optical instrument; an object-finder-holder assembly extending from the base, the object-finder-holder assembly comprising one or more object-finder holders for removably holding the object finder; a shadow-casting member; and a projection plate moveably coupled to at least one of the base, the object-finder-holder assembly and the shadow-casting member for movement between a first position and a second position. Movement of the projection plate between the first and second positions may involve movement of the projection plate relative to the shadow-casting member. The system is convertible between: a first working mode, wherein the object finder is held by the one or more object-finder holders and the projection plate is moved to the first position, thereby permitting use of the object finder held by the one or more object-finder holders to locate objects; and a second working mode wherein the object finder is removed from the one or more object-finder holders, the projection plate is moved to the second position and a shadow of at least a portion of the shadow-casting member is cast onto the projection plate when the optical instrument is directed toward a luminous object.

Systems according to various embodiments may comprise any features, combinations of features and/or sub-combination of features of the object-finder-mounting apparatus described herein. Another aspect of the invention provides kits which comprise the components of any of the systems described herein.

Another aspect of the invention provides a method for locating objects for viewing with an optical instrument. The method comprises providing an optical system comprising: an optical instrument for viewing objects; an object finder mountable to the optical instrument for locating objects for viewing with the optical instrument; and an object-finder-mounting apparatus for mounting an object finder to an optical instrument. The object-finder-mounting apparatus comprises: a base for coupling the object-finder-mounting apparatus to the optical instrument; an object-finder-holder assembly extending from the base, the object-finder-holder assembly comprising one or more object-finder holders for removably holding the object finder; a shadow-casting member; and a projection plate moveably coupled to at least one of the base, the object-finder-holder assembly and the shadow-casting member for movement between a first position and a second position. Movement of the projection plate between the first and second positions may involve movement of the projection plate relative to the shadow-casting member. The method also comprises converting the optical system between: a first working mode, wherein the object finder is held by the one or more object-finder holders and the projection plate is moved to the first position, thereby permitting use of the object finder held by the one or more object-finder holders to locate a first object; and a second working mode wherein the object finder is removed from the one or more object-finder holders, the projection plate is moved to the second position and a shadow of at least a portion of the shadow-casting member is cast onto the projection plate when the optical instrument is directed toward a second, luminous object.

Methods according to this aspect of the invention may comprise any features, combinations of features and/or sub-combination of features of the object-finder-mounting apparatus described herein, including operational features thereof.

Another aspect of the invention provides a method for using an object-finder-mounting apparatus. The method comprises: providing an object-finder-holder assembly comprising one or more object-finder holders for removably holding an object finder; mounting the object-finder-holder assembly to an optical instrument; providing a shadow-casting member; providing a projection plate that is moveable between a first position and a second position; and converting the object-finder-mounting apparatus between: a first working mode, wherein the object finder is held by the one or more object-finder holders and the projection plate is moved to the first position, thereby permitting use of the object finder held by the one or more object-finder holders to locate a first object; and a second working mode wherein the object finder is removed from the one or more object-finder holders, the projection plate is moved to the second position and a shadow of at least a portion of the shadow-casting member is cast onto the projection plate when the optical instrument is directed toward a second, luminous object. Movement of the projection plate between the first and second positions may involve movement of the projection plate relative to the shadow-casting member.

Methods according to this aspect of the invention may comprise any features, combinations of features and/or sub-combination of features of the object-finder-mounting apparatus described herein, including operational features thereof.

Another aspect of the invention provides an object-finder-mounting apparatus which may be used to locate objects. The object-finder-mounting apparatus comprises: an object-finder-holder assembly, and a projection plate. The object-finder-holder assembly comprises one or more object-finder holders which removably hold an object finder in place. The one or more object-finder holders may comprise at least one rear object-finder holder, which may be relatively proximate to the user's eye when the user is using the object finder to locate objects. The object-finder-holder assembly may also optionally include a front object-finder holder, which may be relatively more distal to the user's eye when the user is using the object finder to locate objects. The projection plate is movably (e.g. pivotably) coupled to the object-finder-holder assembly at one end, such that the projection plate can move between a first position and a second position. The object-finder mounting apparatus is convertible between a first working mode and a second working mode. In the first working mode, the object finder is held by the one or more object-finder holders and the projection plate is moved to its first position where a generally planar surface thereof is relatively more aligned with an adjacent surface of the object-finder-holder assembly. In the second working mode, the object finder is removed from the one or more object-finder holders and the projection plate is moved to its second position wherein its generally planar surface extend relatively further way from the adjacent surface of the object-finder-holder assembly. In the second working mode, due to the emission of light from a luminous target (e.g., the sun), a shadow of the shadow-casting member—which may comprise a portion of the optional front object-finder holder—is projected on the generally planar surface of the projection plate. The projection plate may comprise a mark, a reticule or other suitably shaped markings on it, so as to locate the shape of the shadow cast by the shadow-casting member. To point the object finder and the telescope to the luminous target, a user manipulates the object finder and/or telescope such that the projected shadow of the shadow-casting member aligns with the markings on the projection plate. For example, in an embodiment where the shadow-casting member comprises the front object-finder holder, and wherein the front object-finder holder comprises a ring, the user may manipulate the object-finder-mounting apparatus (and the optical instrument to which it is mounted) such that the projected shadow of the front ring holder is concentric with a corresponding ring-shaped mark on the surface of the projection plate.

In another embodiment, an object-finder-mounting apparatus comprises: a base for coupling the object-finder-mounting apparatus to an optical instrument; an object-finder-holder assembly extending from the base, the object-finder-holder-assembly comprising one or more object-finder holders for removably holding an object finder; a shadow-casting member; and a projection plate. Each of the shadow-casting member and the projection plate is separately moveably coupled to at least one of the base, the object-finder assembly or to one another for movement between a first position and a second position. The object-finder-mounting apparatus is convertible between: a first working mode, wherein the shadow-casting member and projection plate are moved to their first positions which permits the use of the object finder; and a second working mode wherein the shadow-casting member and projection plate are moved to their second positions wherein a shadow of at least a portion of the shadow-casting member is projected onto the projection plate when the optical instrument is directed toward a luminous object.

Another aspect of the invention provides a method for using an object-finder-mounting apparatus, the method comprising: providing an object-finder-holder assembly comprising one or more object-finder holders for removably holding an object finder; mounting the object-finder-holder assembly to an optical instrument; providing a shadow casting member; and providing a projection plate. Each of the shadow-casting member and the projection plate is separately movable between a first position and a second position. The method also involves converting the object-finder-mounting apparatus between: a first working mode, wherein the object finder is held by the one or more object-finder holders and the shadow-casting member and projection plate are moved to their first positions, thereby permitting use of the object finder held by the one or more object-finder holders to locate a first object; and a second working mode wherein the object finder is removed from the one or more object-finder holders, the shadow-casting member and the projection plate are moved to their second positions and a shadow of at least a portion of the shadow casting member is projected onto the projection plate when the optical instrument is directed toward a second, luminous object.

Another aspect of the invention provides a multifunctional object finding system comprising a fixed connection finderscope base, a finderscope holder (object-finder-holding assembly) and a projection plate. The finderscope holder comprises two ring holders, the forward ring holder and the rearward ring holder, which fix and hold a finderscope (object finder). The projection plate is movably (e.g. pivotally) coupled, so that the projection plate is able to move between at least two working modes. While in the first working mode, the projection plate is moved to lay on an adjacent surface of the finderscope base and/or the finderscope holder. While in the second working mode, the projection plate extends away from the adjacent surface of the finderscope base and/or the finderscope holder. In the second working mode, due to the emission of the light of a luminous target, the annular-shaped shadow of the forward ring holder will be projected on the surface of the projection plate. The projection plate may have suitable markings (e.g. an annular circle mark, a suitable reticule or the like), such that the projected shadow of the forward ring holder can be aligned with the markings on the projection plate.

The rearward ring holder may comprise several threaded holes distributed on the ring and used to install the adjusting screws, which may be used to adjust the orientation of the finderscope relative to an optical instrument (e.g. telescope) to which it is mounted. One side of the forward ring holder may comprise several distributed openings of elastic claws which grip an outer wall of the finderscope. The projection plate may be located between the forward and rearward ring holders and with one end of the plate located below the rearward ring holder and may be joined to the rearward ring holder by pivot joint. In the second working mode, the projection plate may be aligned parallel to a diameter of the rearward ring holder and the annular shaped shadow of the forward ring holder may be projected on the projection plate when aligned with a luminous target. The projection of the shadow of the forward ring may be coincident (e.g. concentric) with an annular mark on the projection plate when aligned with the luminous object. Both sides of the finderscope base and on both sides of the finderscope holder may comprise triangular cross-sectioned grooves. The finderscope holder and the finderscope base may be connected to one another by a pair of dovetail seats, each of which comprises a pair of projections that extend into the triangular cross-sectioned grooves on one side of the finderscope base and the finderscope holder. The dovetail seats may join the finderscope holder and the base together using compound screws, which may be screwed through the dovetail seats. A pan head screw may penetrate through one end of the projection plate to provide a pivot axis of a pivot joint.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive. In drawings which illustrate non-limiting embodiments of the invention.

DETAILED DESCRIPTION

Figure 1A:
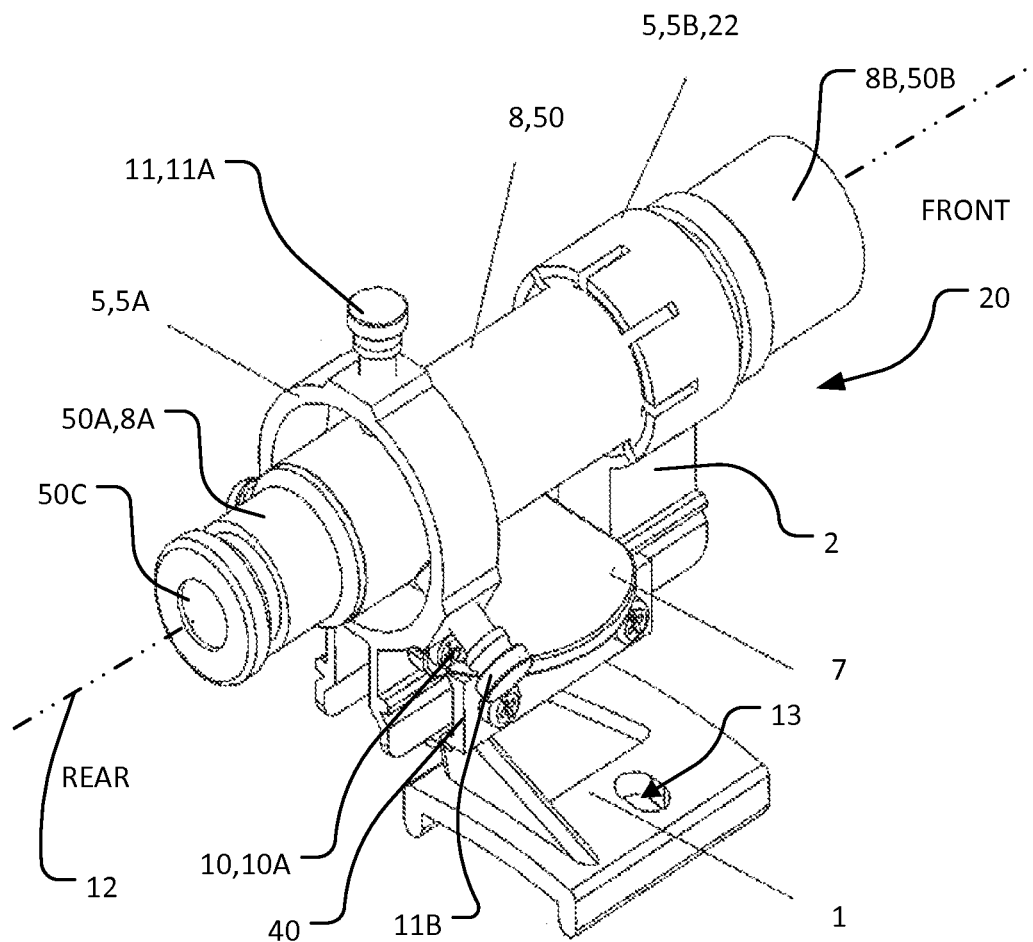
FIG. 1A is a perspective view of an object-finder-mounting apparatus in a first working mode according to an example embodiment of the invention where the object-finder-mounting apparatus holds an object finder.
Figure 1B:
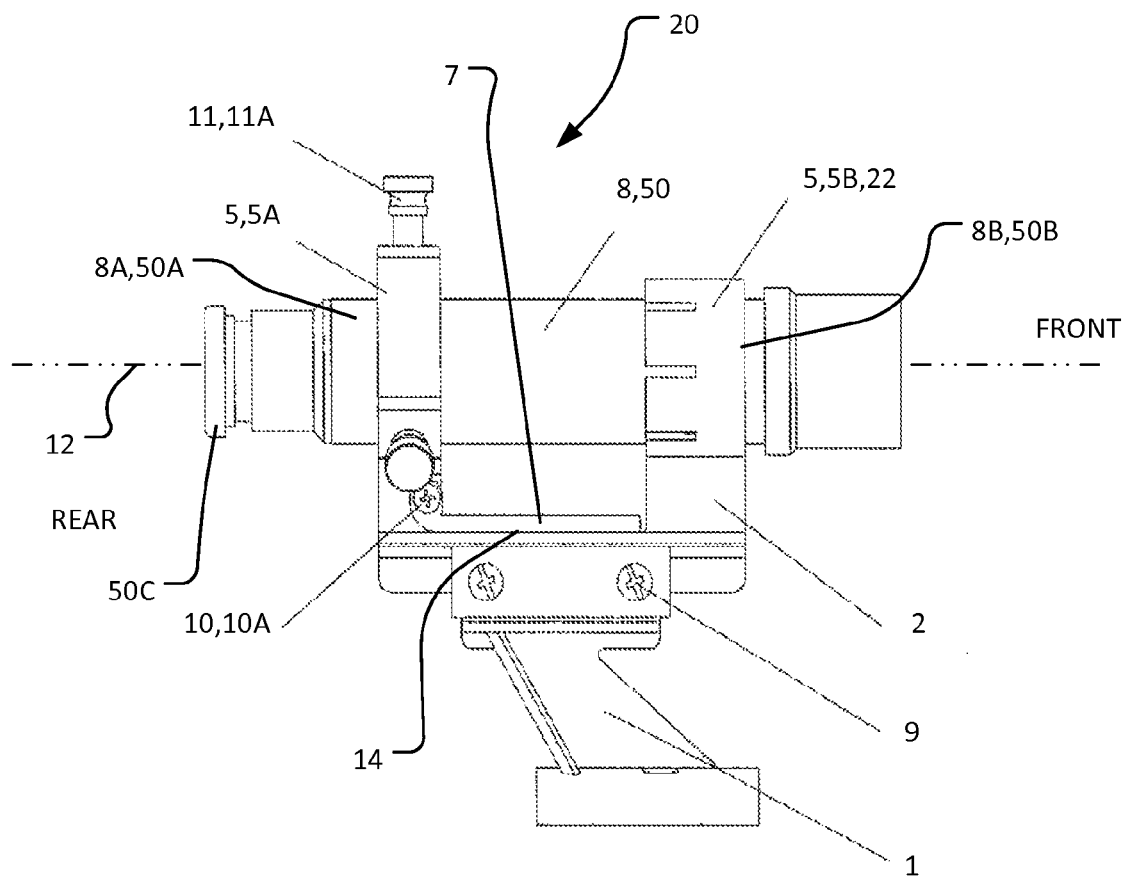
FIG. 1B is a side view of the FIG. 1A object-finder-mounting apparatus in its first working mode.
Figure 1C:
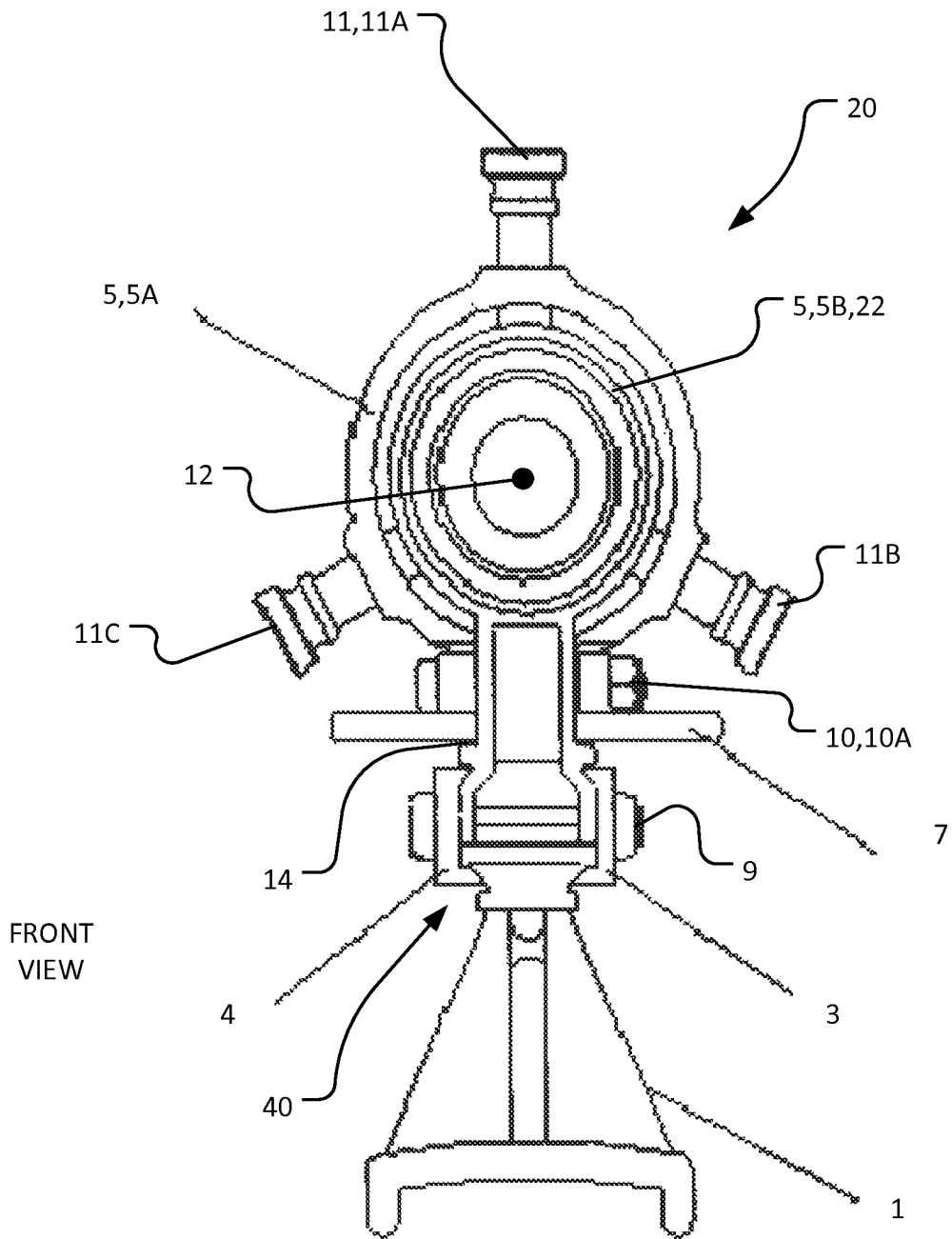
FIG. 1C is a front view of the FIG. 1A object-finder-mounting apparatus in its first working mode.
Figure 1D:
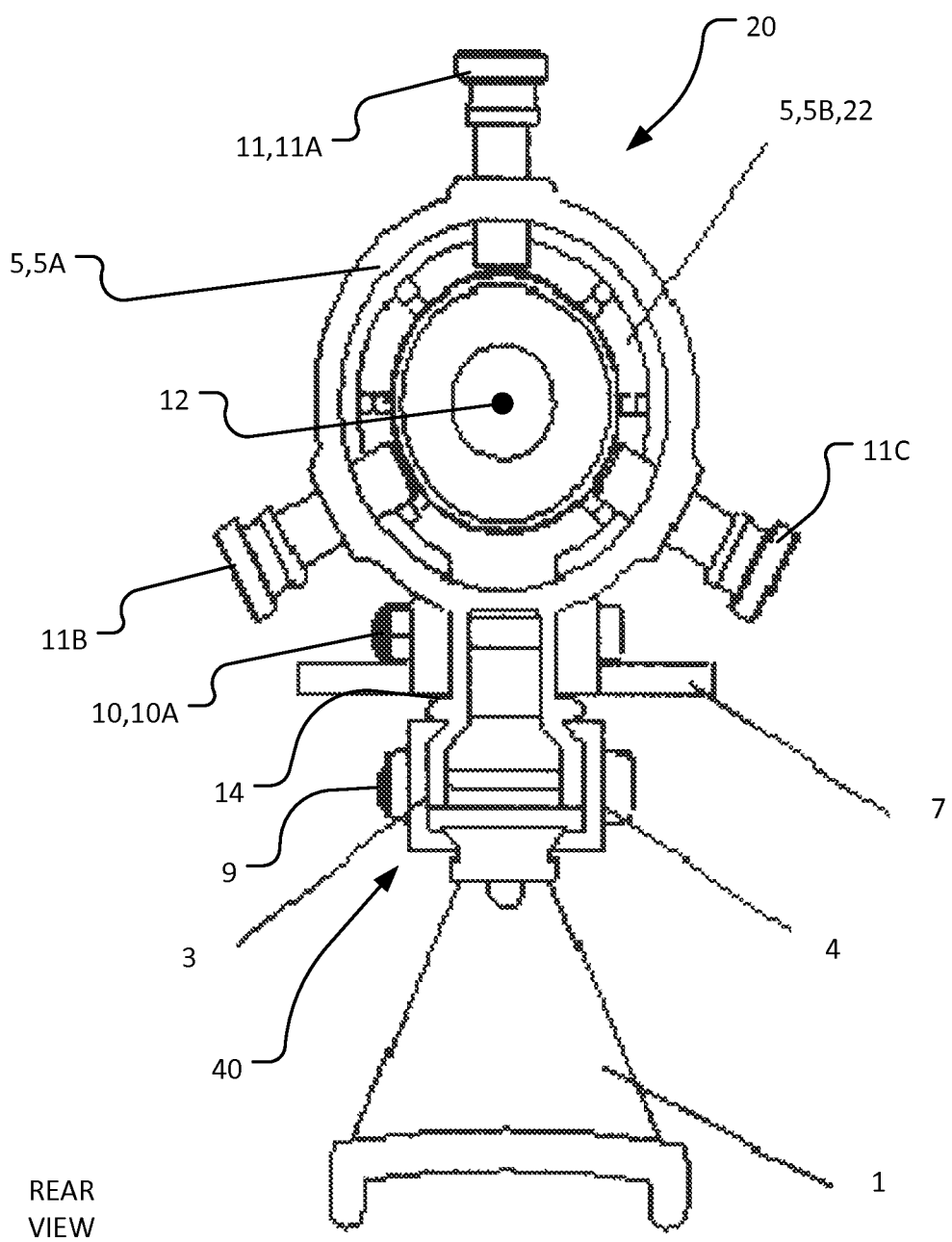
FIG. 1D is a rear view of the FIG. 1A object-finder-mounting apparatus in its first working mode.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

FIGS. 1A-1E (collectively, FIG. 1) show an object-finder-mounting apparatus 20 according to an example embodiment of the invention in a first working mode. FIGS. 2A-2E (collectively, FIG. 2) show object-finder-mounting apparatus 20 in a second working mode. Object-finder-mounting apparatus 20 of the illustrated embodiment (FIGS. 1 and 2) comprises: a base 1 which is couplable to a primary optical instrument 30

(FIG. 1E, FIG. 2E); an object-finder-holder assembly 2 which extends from base 1 and which provides one or more object-finder holders 5 configured to hold (e.g. support) an object finder 8; a shadow-casting member 22; and a projection plate 7 which is moveably coupled to base 1, to object-finder holder assembly 2 and/or to shadow-casting member 22 for movement between a first position (shown in FIG. 1) and a second position (shown in FIG. 2). It can be seen from comparing FIG. 1 to FIG. 2 that movement of projection plate 7 between the first position (FIG. 1) and the second position (FIG. 2) involves movement of projection plate 7 relative to shadow-casting member 22—shown best by comparing FIGS. 1A, 1B and 1E to FIGS. 2A, 2B and 2E. In operation, object-finder-mounting apparatus 20 is convertible between: a first working mode, where object finder 8 is held by the one or more object-finder holders 5 and projection plate 7 is moved to the first position (FIG. 1) which permits use of object finder 8 held by the one or more object-finder holders 5 to locate objects; and a second working mode, where object finder 8 is removed from the one or more object-finder holders 5, projection plate 7 is moved to the second position (FIG. 2) and a shadow of at least a portion of shadow-casting member 22 is cast onto projection plate 7 when primary optical instrument 30 is directed toward a luminous object.

In this description and the accompanying drawings, the words front and rear (and similar words) are used for convenience and brevity and should not be interpreted in the strict sense, unless required for clarity.

When object-finder-mounting apparatus 20 of the embodiment illustrated in FIGS. 1 and 2 is used its first working mode (shown in FIG. 1), a user first uses object finder 8 to find objects. Object finder 8 comprises a spotting scope 50 in the case of the illustrated embodiment, but may generally comprise any other type of object finder, such as a red beam finder, a laser pointer and/or the like. In the first working mode (shown in FIG. 1), objects are located by moving the combination of spotting scope 50 and primary optical instrument 30 (to which spotting scope 50 is mounted via object-finder-mounting apparatus 20) until the target object(s) are located in the relatively wide field of view of spotting scope 50 and then moving the combination of spotting scope 50 and primary optical instrument 30, such that the target object(s) are located approximately at the center of the field of view of spotting scope 50. In use, when a user looks through spotting scope 50, the user puts their eye against ocular portion 50C of spotting scope 50. Ocular portion 50C is typically but not necessarily located in rear portion 50A of spotting scope 50. In such embodiments, when a user is looking through spotting scope 50 in the first working mode, rear portion 50A of spotting scope 50 is relatively proximal to the user's eyes and front portion 50B of spotting scope 50 is relatively more distal to the user's eyes. Similarly, in the case of use of spotting scope 50 of the illustrated embodiment, first, rear object-finder holder 5A is relatively proximal to the user's eyes when a user is looking through spotting scope 50 in the first working mode, and second, front object-finder holder 5B is relatively more distal to the user's eyes when the user is looking through spotting scope 50 in the first working mode.

Figure 1E:
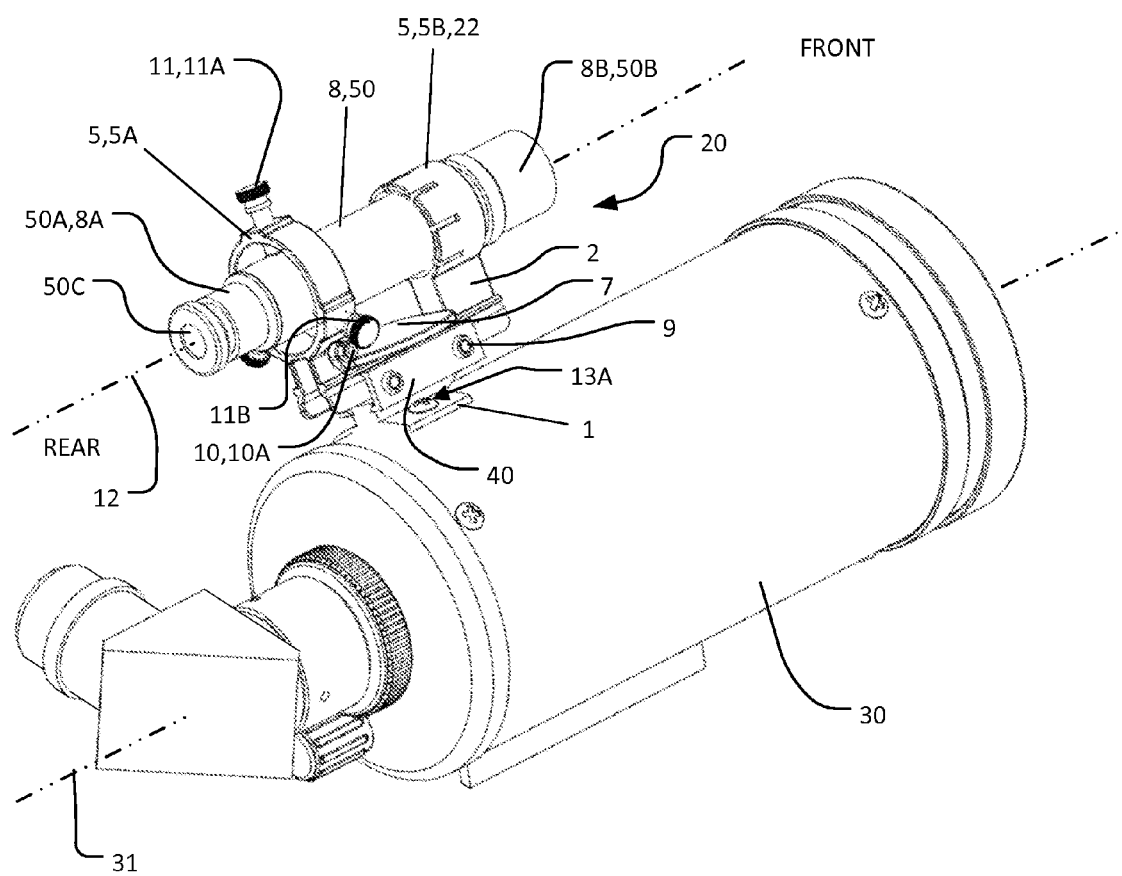
FIG. 1E is a perspective view of a system for viewing objects with an optical instrument according to a particular embodiment which incorporates an optical instrument and the FIG. 1A object-finder-mounting apparatus in its first working mode where the object-finder-mounting apparatus holds an object finder.
Figure 2A:
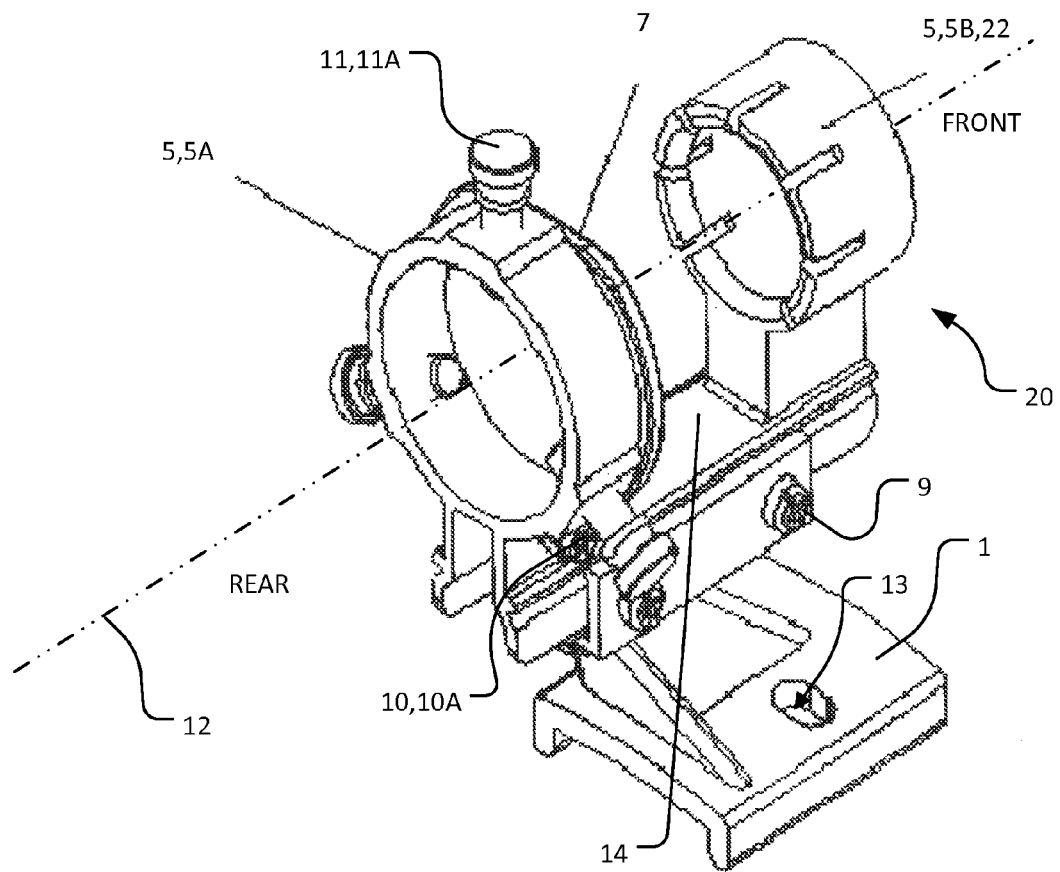
FIG. 2A is a perspective view of the FIG. 1A object-finder-mounting apparatus in a second working mode.
Figure 2B:
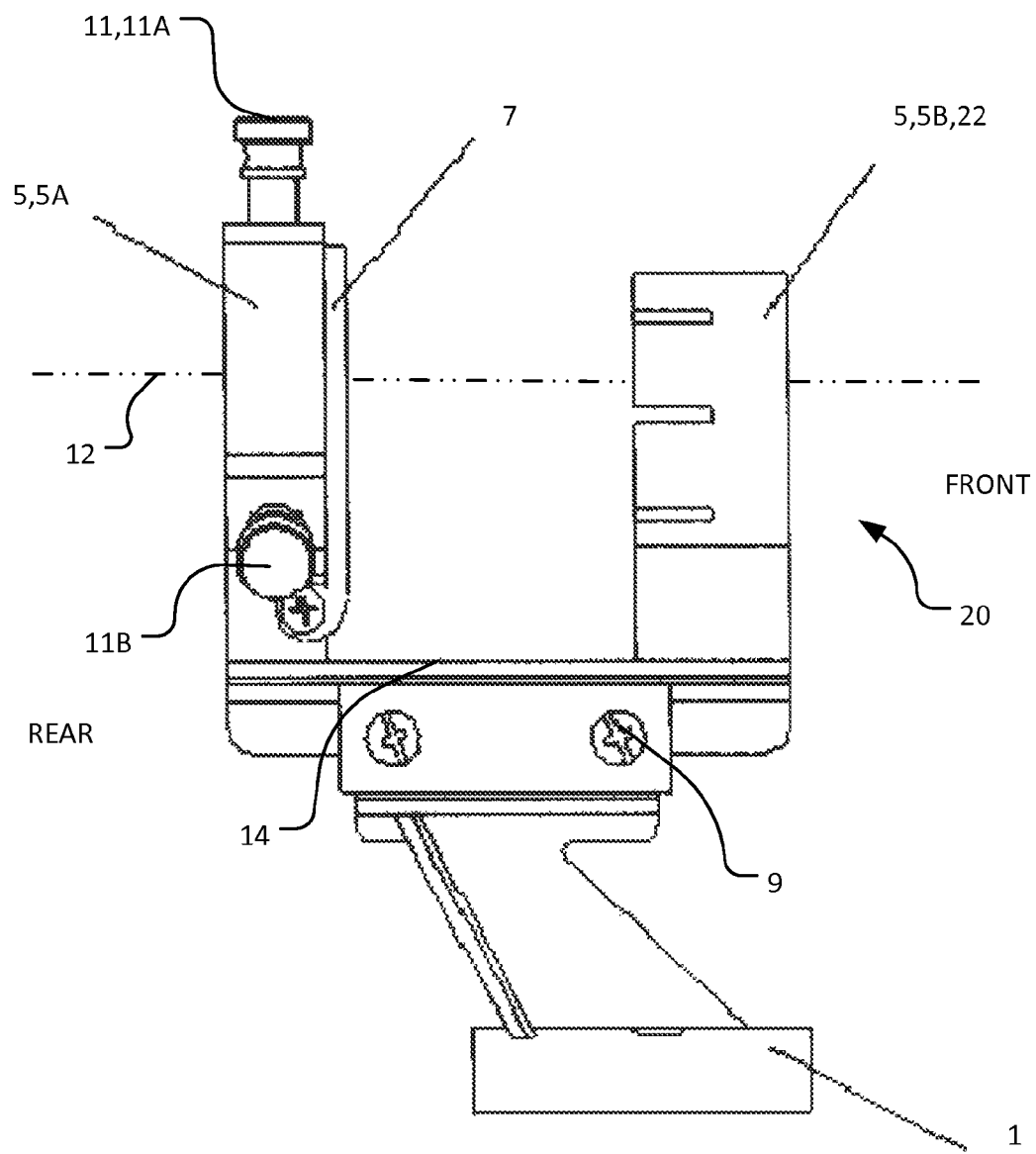
FIG. 2B is a side view of the FIG. 2A object-finder-mounting apparatus in its second working mode.
Figure 2C:
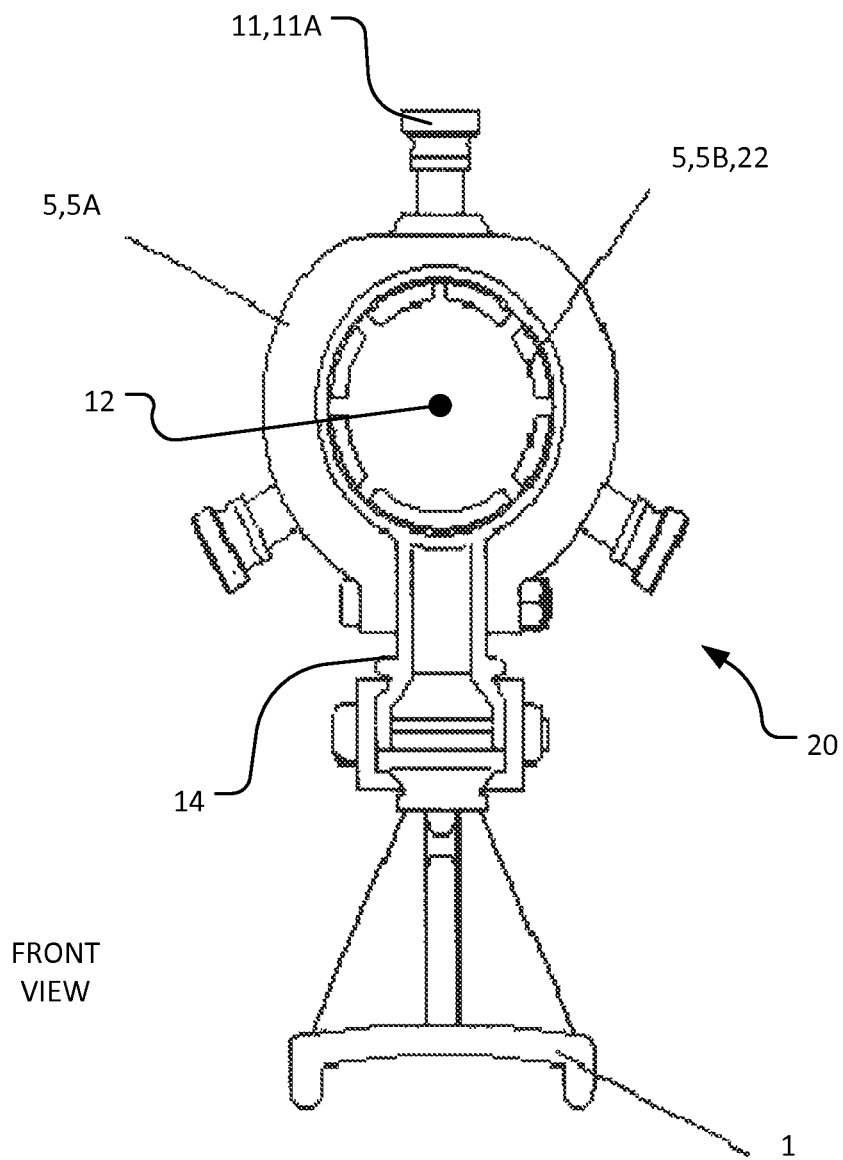
FIG. 2C is a front view of the FIG. 2A object-finder-mounting apparatus in its second working mode.
Figure 2D:
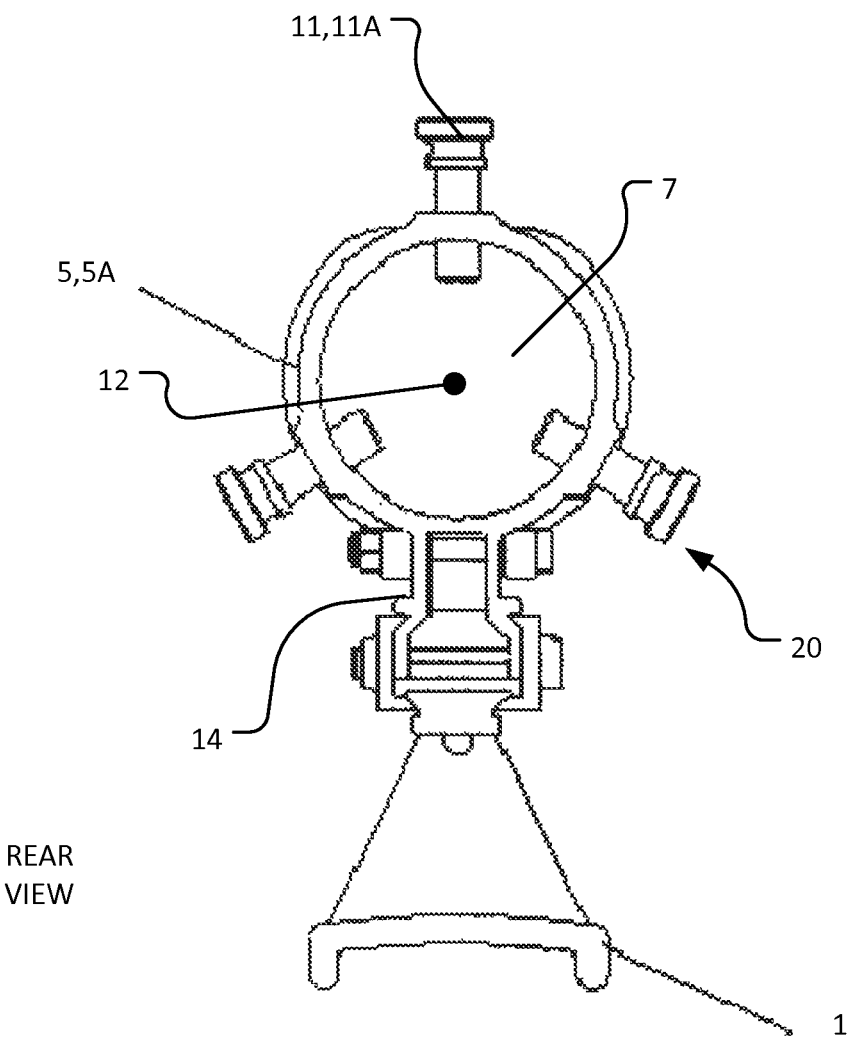
FIG. 2D is a rear view of the FIG. 2A object-finder-mounting apparatus in its second working mode.
Figure 2E:
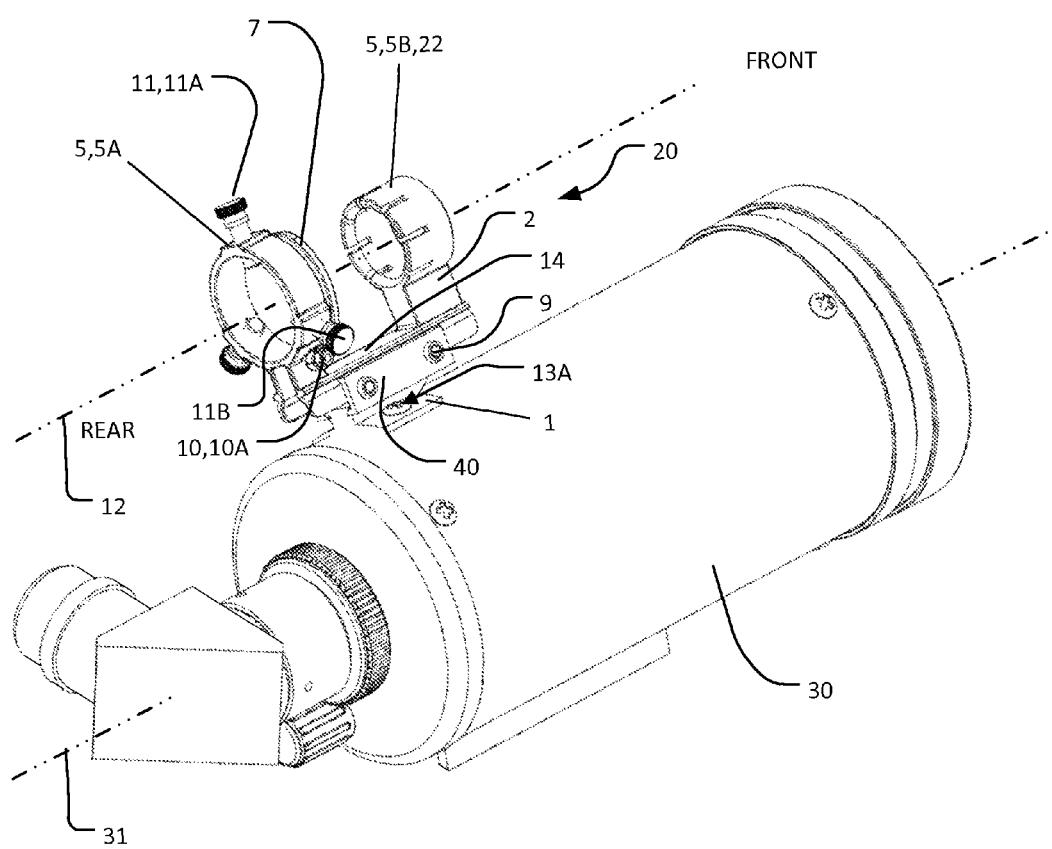
FIG. 2E is a perspective view of a system for viewing objects with an optical instrument according to a particular embodiment which incorporates an optical instrument and the FIG. 2A object-finder-mounting apparatus in its second working mode.

Primary optical instrument 30 (FIG. 1E, FIG. 2E) to which object-finder-mounting apparatus 20 is mounted may typically comprise a high-magnification optical instrument, such as a telescope, a surveying optical instrument and/or the like. Base 1 of object-finder-mounting apparatus 20 may be used to install or mount object-finder-mounting apparatus 20 onto optical instrument 30 (FIG. 1E). In the illustrated embodiment, base 1 may be coupled to an optical instrument 30 by extending suitable fasteners 13A (shown in FIGS. 1E, 2E) through apertures 13 (FIGS. 1A, 2A) in base 1. Those skilled in the art will appreciate that there are many techniques and mechanisms which may be used to mount base 1 of object-finder-mounting apparatus 20 to an optical instrument 30.

Object-finder-mounting apparatus 20 of the FIG. 1 and FIG. 2 embodiment also comprises object-finder-holder assembly 2. In some embodiments, object-finder-holder assembly 2 and base 1 are integrally formed. In some embodiments (including the illustrated embodiment of FIGS. 1 and 2), object-finder-mounting apparatus 20 optionally comprises a coupling mechanism 40 which couples object-finder-holder assembly 2 to base 1. Coupling mechanism 40 of the illustrated embodiment includes left and right dovetail seats 3, 4 and fasteners 9. In the embodiment of FIG. 1 and as best seen in FIGS. 1C and 1D, the sides of object-finder-holder assembly 2 and base 1 are provided with triangularly cross-sectioned grooves for slidably receiving upper and lower projections of dovetail seats 3, 4. Fasteners 9 penetrate through apertures in dovetail seats 3, 4 to draw the projections of dovetail seats 3, 4 into the triangular cross-sectioned grooves in object-finder-holder assembly 2 and base 1 and to thereby secure object-finder-holder assembly 2 to base 1 via dovetail seats 3, 4.

In the embodiment illustrated in FIG. 1, object finder 8 comprises spotting scope 50. In some embodiments, object finder 8 may comprise a different type of object finder as described in more detail below. In the following description of the FIG. 1 embodiment, object finder 8 may be described as spotting scope 50 without loss of generality. In the first working mode shown in FIG. 1, spotting scope 50 is mounted to and supported by object-finder-holder assembly 2. In the illustrated embodiment of FIGS. 1 and 2, object-finder-holder assembly 2 comprises: a first (rear) object-finder holder 5A (located to support a rear portion 8A of object finder 8 (rear portion 50A of spotting scope 50)) and a second (front) object-finder holder 5B (located to support a front portion 8B of object finder 8 (front portion 50B of spotting scope 50). In some embodiments, object-finder-mounting apparatus 20 may comprise different numbers of object-finder holders 5 which comprise any suitable releasable coupling mechanism for holding onto the body of, or otherwise coupling to or supporting, object finder 8 (spotting scope 50). By way of non-limiting example, object-finder mounting apparatus may be provided with a single object-finder holder 5 with any suitable releasable coupling mechanism. One or both of rear and front object-finder holders 5A, 5B may comprise ring holders having rings through which the rear and front portions 50A, 50B of spotting scope 50 project, as is the case in the illustrated embodiment. As discussed in more detail below, one or more object-finder holders 5 may optionally be used to orient spotting scope 50 relative to base 1.

In the illustrated embodiment, where object finder holders 5 are both ring holders, spotting scope 50 is mounted to object-finder-holder assembly 2 by projecting spotting scope 50 through the corresponding rings of first and second object-finder holders 5A, 5B. Second object-finder holder 5B, which may be located at or near the front end of object-finder-mounting apparatus 20, may comprise any suitable releasable coupling mechanism for holding onto the body of, or otherwise coupling to or supporting, front portion 8B of object finder 8 (front portion 50B of spotting scope 50). In one particular embodiment, second object-finder holder 5B comprises one or more rings and one or more evenly distributed elastic claws for uniformly grasping or clamping front portion 50B of spotting scope 50.

First object-finder holder 5A, which may be located at or near the rear end of object-finder-mounting apparatus 20, may comprise any suitable releasable coupling mechanism for holding onto the body of, or otherwise coupling to or supporting, rear portion 8A of object finder 8 (rear portion 50A of spotting scope 50). In one particular embodiment, first object-finder holder 5A comprises a ring having a plurality (e.g. three) adjustment screws 11A, 11B, 11C which together support rear portion 50A of spotting scope 50. In the case of the illustrated embodiment, adjustment screws 11A, 11B, 11C also provide adjustment mechanism 11 for adjusting the orientation of spotting scope 50 relative to base 1 (and relative to primary optical instrument 30 (FIG. 1E)). In the illustrated embodiment, first object-finder holder 5A is penetrated by a plurality (e.g. three) radially extending threaded holes which are distributed (e.g. evenly) about the ring of rear object-finder holder 5A. Adjustment screws 11A, 11B, 11C are respectively screwed through the threaded holes to bear against the body of spotting scope 50 and to thereby support rear portion 50A of spotting scope 50. Adjustment screws 11A, 11B, 11C are individually threadably adjustable relative to object-finder holder 5A to provide adjustment mechanism 11. Adjustment mechanism 11 permits a user to align the optical axis 12 of spotting scope 50 with the optical axis 31 of primary optical element 30. When these optical axes 12, 31 are parallel, spotting scope 50 and primary optical instrument 30 will have fields of view that are oriented in the same direction. First object-finder holder 5A may additionally or alternatively comprise any suitable releasable coupling mechanism for holding onto the body of, or otherwise coupling to or supporting, rear portion 8A of object finder 8 (rear portion 50A of spotting scope 50). In one particular embodiment, first object-finder holder 5A comprises one or more rings and one or more evenly distributed elastic claws for uniformly grasping or clamping rear portion 50A of spotting scope 50.

Object-finder-mounting apparatus 20 also comprises a projection plate 7 coupled for movement between a first position and a second position. Projection plate 7 may be movably coupled to base 1, object-finder-holder-assembly 2 and/or shadow-casting member 22 for movement relative thereto. Projection plate 7 may be movably coupled using a suitable pivot joint for pivotal movement relative to base 1, object-finder-holder-assembly 2 and/or shadow-casting member 22. In the illustrated embodiment, projection plate 7 is pivotally coupled to the object-finder-holder assembly 2 with a fastener (e.g. a pan-head screw) 10 which penetrates through projection plate 7 and through the bottom of object-finder holder 5A, such that fastener 10 acts as a shaft of a pivot joint 10A around which projection plate 7 can pivot.

When object-finder-mounting apparatus 20 is used in its first working mode and spotting scope 50 is used for locating object(s), projection plate 7 may be moved into a first position which permits the use of object finder 8 (spotting scope 50) held by the one or more object-finder holders 5. As example of such a first position is shown in FIG. 1. In the FIG. 1 position, projection plate 7 is in a first position that permits the use of object finder 8 (spotting scope 50) held by the one or more object-finder holders 5. In the particular case of the FIG. 1 embodiment, when projection plate 7 is in its first position, projection plate 7 is oriented so that its generally planar surface is generally aligned with an adjacent surface 14 of base 1 and/or object finder-holder assembly 2—e.g. to lay in a plane generally parallel to the axis 12 of spotting scope 50 and the axis 31 of primary optical instrument 30, as shown in FIG. 1. The first position of projection plate 7 may be spaced apart from object finder 8 held by object-finder-holding assembly 2. As will become apparent from the further discussion below, the first position of projection plate 7 may be such that the generally planar surface of projection plate 7 is relatively more aligned with an adjacent surface 14 of base 1 and/or object finder-holder assembly 2 and the second position of projection plate 7 may be such that the generally planar surface of projection plate 7 extends relatively further aware from adjacent surface 14 of base 1 and/or object finder-holder assembly 2.

As mentioned briefly above, base 1 of object-finder-mounting apparatus 20 can be mounted and installed on a telescope or other primary optical instrument 30 (FIG. 1E). Adjusting adjustment screws 11A, 11B, 11C relative to object-finder holder 5A will align the optical axis 12 of spotting scope 50 such that the optical axis 12 of spotting scope 50 can be made parallel to the optical axis 31 of primary optical instrument 30. Such parallel alignment will ensure that the center of the fields of view of both spotting scope 50 and primary optical instrument 30 will point at least approximately in the direction of the same distant target. Therefore, in the observing activity that follows, when a user directs spotting scope 50 to point to a desired target object and moves the target object to the center of the field of view of spotting scope 50, this simultaneously places the target object the field of view of primary optical instrument 30. Using spotting scope 50 (object finder 8) in this manner may make it much easier to locate a target object in primary optical instrument 30, since the field of view of spotting scope 50 is usually wider than the field of view in primary optical instrument 30.

It will be appreciated that object-finder-mounting apparatus 20 can be used or modified for use with a variety of different spotting scopes of different shapes and/or sizes. In addition to spotting scopes, object-finder-mounting apparatus 20 can be used or modified for use with a variety of different types of object finders, such as, by way of non-limiting example, a red beam finder, a laser pointer, a view-finder and/or any other instrument that may assist a user in pointing the optical instrument towards a specific target object.

FIG. 2 shows object-finder-mounting apparatus 20 in a second working mode. In the second working mode of the FIG. 2 embodiment of object-finder-mounting apparatus 20, object finder 8 is removed from object-finder-holder assembly 2 and projection plate 7 is moved to a second position (e.g. pivoted to the orientation) shown in FIG. 2. In the second working mode of the FIG. 2 embodiment of object-finder-mounting apparatus 20, projection plate 7 is moved to a second position wherein projection plate 7 extends relatively far (compared to its first position) away from an adjacent surface 14 of base 1 and/or object-finder-holder assembly 2. In the second working mode of the FIG. 2 embodiment of object-finder-mounting apparatus 20, projection plate 7 may be moved to a second position wherein the generally planar surface of projection plate 7 is oriented generally perpendicularly to optical axis 31 of primary optical instrument 30. In the illustrated embodiment, first and second object-finder holders 5A, 5B are ring holders, and, in the second working mode of object-finder-mounting apparatus 20, projection plate 7 may be moved to its second position where it intersects the axis 12 that extends through the centers of first and second ring holders 5A and 5B. In some embodiments, in the second working mode of object-finder-mounting apparatus 20, projection plate 7 is moved to its second position wherein projection plate 7 is oriented so as to be generally aligned with the extension of first object-finder holder 5A away from base 1.

The second working mode of the object-finder-mounting apparatus permits a user to safely and easily point primary optical instrument 30 (FIG. 2E) in the direction of the sun for the purpose of further using primary optical instrument 30 to observe the sun (or other brightly luminous object). For observing the sun, when primary optical instrument 30 (to which object-finder-mounting apparatus 20 is mounted) points toward the sun, axis 12 of object-finder-mounting apparatus 20 mounted on primary optical instrument 30 will also point to the sun. The sunlight will pass front object-finder holder 5B (which acts, in the illustrated embodiment, as a shadow-casting member 22) and will cast a shadow onto projection plate 7. Adjusting the orientation of primary optical instrument 30 will cause the shadow of shadow casting element 22 to move on the surface of projection plate 7. Suitable alignment markings, such as a circle, a reticule and/or the like may be provided on projection plate 7. When primary optical instrument 30 is moved such that the shadow of shadow-casting element 22 is suitably aligned with the markings on projection plate 7, primary optical instrument 30 will be aligned with, and point straight toward, the sun.

For example, in the embodiment illustrated in FIG. 2 wherein shadow-casting member 22 comprises a ring, a ring-shaped marking may be provided on projection plate 7 such that when the ring-shaped shadow cast by shadow-casting member 22 is concentric with the ring-shaped marking on projection plate 7, primary optical instrument 30 will be aligned with, and point straight toward, the sun. At this moment, a user can easily find and observe the sun using primary optical instrument 30. This may be particularly useful for an observer wishing to view the sun using an optical telescope fitted with one or more solar filters. A benefit of object-finder-mounting apparatus 20 in such a scenario is that a user can safely and easily point the telescope toward the sun without looking at the sun using an object finder such as a spotting scope. This possibility prevents damage to the user's eyes when searching for the sun using a spotting scope or other traditional object finder. In general, it is not necessary that shadow-casting member 22 be provided by front object-finder holder 5B. Shadow casting member 22 may be provided by separate element(s). Shadow-casting member 22 may also move between a first position (usable in the first working mode) where it does not cast a shadow on projection plate 7 and a second position (usable in the second working mode) where it is positioned to cast a shadow on projection plate 7 when primary optical instrument 30 is directed toward a luminous object.

Figure 3A:
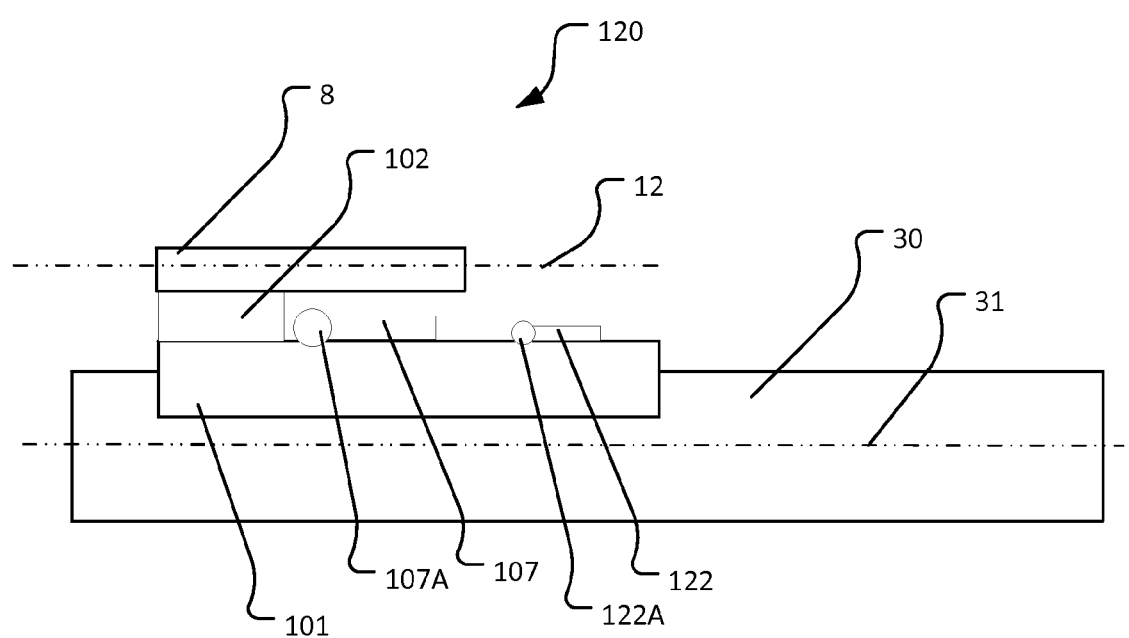
FIG. 3A schematically depicts an object-finder-mounting apparatus which mounts an object-finder to an optical instrument in a first working mode according to another example embodiment of the invention.
Figure 3B:
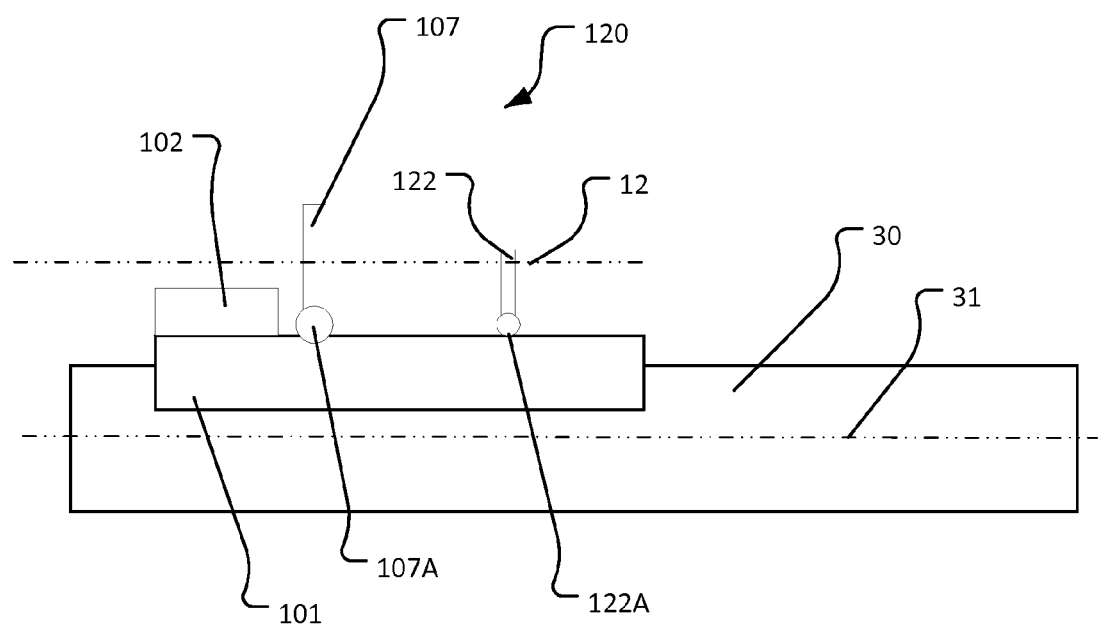
FIG. 3B schematically depicts the FIG. 3A object-finder-mounting apparatus in a second working mode.

FIG. 3A shows an object-finder-mounting apparatus 120 according to another example embodiment in a first working mode. FIG. 3B shows object-finder-mounting apparatus 120 in a second working mode. In many respects, object-finder-mounting apparatus 120 is similar to object-finder-mounting apparatus 20 described above. Object-finder-mounting apparatus 120 comprises: a base 101 which is couplable to a primary optical instrument 30; an object-finder-holder assembly 102 which extends from base 101 and which provides one or more object-finder holders (not explicitly shown in FIG. 3A or 3B) configured to hold (e.g. support) an object finder 8; a shadow-casting member 122; and a projection plate 107 which is moveably coupled to base 101, to object-finder holder assembly 102 and/or to shadow-casting member 122 for movement between a first position (shown in FIG. 3A) and a second position (shown in FIG. 3B). In operation, object-finder-mounting apparatus 120 is convertible between: a first working mode, where object finder 8 is held by object-finder holder assembly 102 and projection plate 107 is moved to the first position (FIG. 3A) which permits use of object finder 8 held by object-finder holder assembly 102 to locate objects; and a second working mode, where object finder 8 is removed from object-finder holder assembly 102, projection plate 107 is moved to the second position (FIG. 3B) and a shadow of at least a portion of shadow-casting member 122 is cast onto projection plate 107 when primary optical instrument 30 is directed toward a luminous object. Base 101, object-finder-holder assembly 102, object-finder holder(s) and projection plate 107 of object-finder-mounting apparatus 120 may be similar to base 1, object-finder-holder assembly 2, object-finder holder(s) and projection plate 7 of object-finder-mounting apparatus 20, may provide similar functionality and may incorporate similar modifications.

Object-finder-mounting apparatus 120 differs from object-finder-mounting apparatus 20 described above, in that shadow-casting member 122 is not a part of object-finder-holding assembly 102. Instead, shadow-casting member 122 (like projection screen 107) is moveable between: a first position (FIG. 3A) when object-finder-mounting apparatus 120 is in its first configuration; and a second position (FIG. 3B) when object-finder-mounting apparatus 120 is in its second configuration (FIG. 3B). In the illustrated embodiment, shadow-casting member 122 is pivotally moveable via pivot joint 122A, although this is not necessary. When moved to its first position, shadow-casting member 122 may be out of the way of object finder axis 12 and object finder 8. In some embodiments, this first position may involve an orientation in a plane generally parallel with the place of object finder axis 12 and/or optical instrument axis 31, although this is not necessary. When moved to its second position, shadow-casting member 122 may intersect object finder axis 12 or may be otherwise positioned to cast a shadow on projection screen 107 when projection screen 107 is in its second position.

In general, shadow-casting member 122 may have any suitable shape. In some embodiments, it may be desirable for shadow-casting member 122 to have a cross-shape or the like, so that it may be relatively easy to register the shadow cast by shadow-casting member 122 with the markings on projection screen 107.

Object-finder-mounting apparatus 120 also differs from object-finder-mounting apparatus 20 in the sense that object-finder-holder assembly 102 is located entirely on one side (the rearward side in the case of the illustrated embodiment) of projection screen 107. This is not necessary, however, and in other embodiments, object-finder-mounting apparatus 120 could be modified such that object-finder-holder assembly 102 extends to either side of projection screen 107.

In other respects, object-finder-mounting apparatus 120 is similar to object-finder-mounting apparatus 20 described above.

The above detailed description of example embodiments of the invention are not intended to be exhaustive or to limit the invention to the precise form disclosed above. While specific embodiments of the invention are described for illustrative purposes, various modifications are possible, as those skilled in the relevant art would recognize. For example:

- There are a variety of targeting devices (object finders) that are known in the art and which may become known in the future. Various embodiments of the invention may accommodate any suitable type of object finder, such as, by way of non-limiting example, any suitable viewfinder, variations on a spotting scope, red beam finders, laser object finders and/or the like.
- Those skilled in the art will appreciate that there are variety of suitable holding mechanisms known in the art and that object-finder-holding apparatus may use any such holding mechanisms for object-finder holders.

The scope of the claims should not be limited by the embodiments set forth in the examples, but should be given the broadest interpretation consistent with the description as a whole.

What is claimed is:

1. An object-finder-mounting apparatus for mounting an object finder to an optical instrument, the apparatus comprising:
   a base for coupling the object-finder-mounting apparatus to an optical instrument;
   an object-finder-holder assembly extending from the base, the object-finder-holder assembly comprising one or more object-finder holders for removably holding an object finder;
   a shadow-casting member; and
   a projection plate moveably coupled to at least one of the base, the object-finder-holder assembly and the shadow-casting member for movement of the projection plate, relative to the shadow-casting member, between a first position and a second position;
   wherein the object-finder-mounting apparatus is convertible between: a first working mode, wherein the object finder is held by the one or more object-finder holders and the projection plate is moved, relative to the shadow-casting member, to the first position, thereby permitting use of the object finder held by the one or more object-finder holders to locate objects; and a second working mode wherein the object finder is removed from the one or more object-finder holders, the projection plate is moved, relative to the shadow-casting member, to the second position and a shadow of at least a portion of the shadow-casting member is cast onto the projection plate when the optical instrument is directed toward a luminous object.

2. An object-finder-mounting apparatus according to claim 1 wherein the projection plate is pivotally coupled to at least one of the base, the object-finder-holder assembly and the shadow-casting member for pivotal movement between the first position and the second position.

3. An object-finder-mounting apparatus according to claim 1 wherein the object-finder-holder assembly comprises a front object-finder holder for removably holding a forward portion of the object finder when the object-finder-mounting apparatus is in the first working mode.

4. An object-finder-mounting apparatus according to claim 3 wherein the front object-finder holder comprises a ring through which the forward portion of the object finder extends.

5. An object-finder-mounting apparatus according to claim 4 wherein the front object-finder holder comprises a plurality of elastic claws for grasping the object finder.

6. An object-finder-mounting apparatus according to claim 3 wherein the object-finder-holder assembly comprises a rear object-finder holder for removably holding a rearward portion of the object finder when the object-finder-mounting apparatus is in the first working mode.

7. An object-finder-mounting apparatus according to claim 6 wherein the rear object-finder holder comprises a ring through which the rearward portion of the object finder extends.

8. An object-finder-mounting apparatus according to one claim 7 wherein the rear object-finder holder comprises a plurality of elastic claws for grasping the object finder.

9. An object-finder-mounting apparatus according to claim 6 wherein the projection plate is located between the front and rear object-finder holders when the object-finder-mounting apparatus is in both the first working mode and the second working mode.

10. An object-finder-mounting apparatus according to claim 9 wherein the shadow-casting member is provided at least in part by a portion of the front object-finder holder.

11. An object-finder-mounting apparatus according to claim 3 wherein the shadow-casting member is provided at least in part by a portion of the front object-finder holder.

12. An object-finder-mounting apparatus according to claim 11 wherein the front object-finder holder comprises a ring which casts a circular shadow onto the projection plate when the object-finder-mounting apparatus is in the second working mode.

13. An object-finder-mounting apparatus according to claim 1 wherein the shadow casting member is movably coupled to at least one of the base and the object-finder-holder assembly.

14. An object-finder-mounting apparatus according to claim 13 wherein, when the object-finder-mounting apparatus is in the first working mode, the shadow casting member is moved to a first position which permits the use of the object finder held by the one or more object-finder holders to locate objects, and wherein, when the object-finder-mounting apparatus is in the second working mode, the shadow casting member is moved to a second position wherein the shadow of at least a portion of the shadow casting member is projected onto the projection plate when the optical instrument is directed toward a luminous object.

15. An object-finder-mounting apparatus according to claim 1 wherein at least one of the object-finder holders comprises an adjustment mechanism for adjusting an orientation of an optical axis of the object finder held thereby.

16. An object-finder-mounting apparatus according to according to claim 15 wherein the adjustment mechanism comprises a plurality of threadably adjustable adjustment screws which bear on a body of the object finder such that threadable adjustment of the adjustment screws changes the orientation of the object finder.

17. An object-finder-mounting apparatus according to claim 16 wherein the at least one of the object-finder holders comprises a ring through which the object finder extends when the object-finder mounting apparatus is in the first working mode and the adjustment screws project through the ring to bear on the body of the object finder.

18. An object-finder-mounting apparatus according to claim 1 wherein the object finder is a spotting scope.

19. An object-finder-mounting apparatus according to claim 1 wherein the object finder is a red beam finder.

20. A system for viewing objects with an optical instrument, the system comprising:
   an optical instrument for viewing objects;
   an object finder mountable to the optical instrument for locating objects for viewing with the optical instrument; and
   an object-finder-mounting apparatus for mounting the object finder to the optical instrument, the object-finder-mounting apparatus comprising:
      a base for coupling the object-finder-mounting apparatus to the optical instrument;
      an object-finder-holder assembly extending from the base, the object-finder-holder assembly comprising one or more object-finder holders for removably holding the object finder;
      a shadow-casting member; and
      a projection plate moveably coupled to at least one of the base, the object-finder-holder assembly and the shadow-casting member for movement of the projection plate, relative to the shadow-casting member, between a first position and a second position;
   wherein the system is convertible between: a first working mode, wherein the object finder is held by the one or more object-finder holders and the projection plate is moved, relative to the shadow-casting member, to the first position, thereby permitting use of the object finder held by the one or more object-finder holders to locate objects; and a second working mode wherein the object finder is removed from the one or more object-finder holders, the projection plate is moved, relative to the shadow-casting member, to the second position and a shadow of at least a portion of the shadow-casting member is cast onto the projection plate when the optical instrument is directed toward a luminous object.

21. A kit comprising the components of the system according to claim 20.

22. A method for locating objects for viewing with an optical instrument, the method comprising:

providing an optical system comprising:

an optical instrument for viewing objects;

an object finder mountable to the optical instrument for locating objects for viewing with the optical instrument; and an object-finder-mounting apparatus for mounting an object finder to an optical instrument, the object-finder-mounting apparatus comprising:

a base for coupling the object-finder-mounting apparatus to the optical instrument;

an object-finder-holder assembly extending from the base, the object-finder-holder assembly comprising one or more object-finder holders for removably holding the object finder;

a shadow-casting member; and a projection plate moveably coupled to at least one of the base, the object-finder-holder assembly and the shadow-casting member for movement of the projection plate, relative to the shadow-casting member, between a first position and a second position; and converting the optical system between:

a first working mode, wherein the object finder is held by the one or more object-finder holders and the projection plate is moved, relative to the shadow-casting member, to the first position, thereby permitting use of the object finder held by the one or more object-finder holders to locate a first object; and a second working mode wherein the object finder is removed from the one or more object-finder holders, the projection plate is moved, relative to the shadow-casting member, to the second position and a shadow of at least a portion of the shadow-casting member is cast onto the projection plate when the optical instrument is directed toward a second, luminous object.

23. A method for using an object-finder-mounting apparatus, the method comprising:

providing an object-finder-holder assembly comprising one or more object-finder holders for removably holding an object finder;

mounting the object-finder-holder assembly to an optical instrument;

providing a shadow-casting member;

providing a projection plate that is moveable, relative to the shadow-casting member, between a first position and a second position; and converting the object-finder-mounting apparatus between:

a first working mode, wherein the object finder is held by the one or more object-finder holders and the projection plate is moved, relative to the shadow-casting member, to the first position, thereby permitting use of the object finder held by the one or more object-finder holders to locate a first object; and a second working mode wherein the object finder is removed from the one or more object-finder holders, the projection plate is moved, relative to the shadow-casting member, to the second position and a shadow of at least a portion of the shadow-casting member is cast onto the projection plate when the optical instrument is directed toward a second, luminous object.

* * * * *